United States Patent [19]
Siu et al.

[11] Patent Number: 5,528,215
[45] Date of Patent: Jun. 18, 1996

[54] BUILDING AUTOMATION SYSTEM HAVING EXPANSION MODULES

[75] Inventors: Raymond S. Siu, Lindenhurst; Robert P. Mueller, Hillside; Thomas F. Racke, Deerfield, all of Ill.

[73] Assignee: Landis & Gyr Powers, Inc., Buffalo Grove, Ill.

[21] Appl. No.: 251,462

[22] Filed: May 31, 1994

[51] Int. Cl.⁶ .................................................. G06F 19/00
[52] U.S. Cl. ........................... 340/286.01; 340/310.01; 340/825.06; 340/825.52; 340/825.54; 340/310.06; 364/132; 364/133; 364/441; 364/138; 364/139
[58] Field of Search .................... 340/286.02, 286.01, 340/310 R, 310 A, 310.06, 825.52, 825.54, 825.06; 364/132, 133, 138, 139, 441

[56] References Cited

U.S. PATENT DOCUMENTS

| | | | |
|---|---|---|---|
| 4,567,557 | 1/1986 | Burns | 364/138 |
| 4,982,185 | 1/1991 | Holmberg et al. | 340/825.52 |
| 5,128,855 | 7/1992 | Hilber et al. | 364/132 |
| 5,148,144 | 9/1992 | Sutterlin et al. | 340/310.01 |
| 5,157,658 | 10/1992 | Arai et al. | 340/825.52 |
| 5,200,743 | 4/1993 | St. Martin et al. | 340/310.06 |

*Primary Examiner*—Brent A. Swarthout
*Assistant Examiner*—Dary L. C. Pope
*Attorney, Agent, or Firm*—Greer, Burns & Crain, Ltd.

[57] ABSTRACT

A building automation system is disclosed which enables reliable operation and cost effective expansion. The system utilizes pairs of complementary modules, one of which is a primary module that is installed at a main cabinet and the other is an expansion module that can be located adjacent the mechanical systems which are to be monitored and controlled. Through the use of the complementary pairs of modules, the necessity for providing home runs of power conductors from the mechanical system to the main cabinet are substantially reduced if not eliminated, which greatly reduces the costs of materials and labor in a total installation.

10 Claims, 5 Drawing Sheets

BUILDING AUTOMATION SYSTEM HAVING EXPANSION MODULES

The present invention is generally directed to building automation systems, and more particularly to improvements in such systems which provide the capability of expanding such systems in an efficient and cost effective manner while maintaining reliable operation.

In U.S. Pat. No. 5,128,855 to Hilber et al. (the '855 patent), an arrangement for the control of an operating installation of a building automation system is disclosed. The arrangement comprises a control module serving as a master transmitter-receiver and at least one function module serving as a slave transmitter-receiver. A bus rail connects the control module and the function modules for the transmission of addresses and data and for the transmission of operating voltages. The aforementioned '855 patent relates to the supervision, control and regulation of a technical operating plant of a building automation system and the system is useful in many applications and exhibits many desirable advantages and attributes which are set forth in the patent, which '855 patent is specifically incorporated by reference herein.

By way of background, the concept of a technical operating plant comprises all the power current, hydraulic and pneumatic installations of an automation system of a building, including their control and answerback communication elements, but not including the actual control and answerback signals. The control and answerback communication elements are here sensors, e.g., temperature and/or pressure sensors, servo components for mixing valves and/or motors of pumps, compressors, blower-burners and aerators, or control elements comprising, for example, safety coils and answerback communication contacts.

The system disclosed in the '855 patent realizes four main functions, which are set forth below:

1. Supervision: It comprises central messages (display, logging, alarms, etc.) signaling extraordinary installation states as well as maintenance messages to the operating personnel.
2. Control: It comprises switching the installation or parts of the installation on and off, as well as the resetting of desired values by means of programs or through manual intervention at an operator station.
3. Optimizing the overall operation through optimal energy coordination of the individual parts of installations. The computing programs contained in the system make it possible to coordinate the various plants installed in a building by means of arithmetic or logical linking of state values of a building (temperature, humidity, rpm's, hours of operation etc.) and thus to optimize the operating costs.
4. Support of the building management, e.g., through the monitoring of hours of operations, malfunction statistics, supervision of watchmen's rounds, admission control, etc.

While the system disclosed in the '855 patent represented an improvement over the prior art and reliably operated to control the equipment that it was to control, there was a need to provide for expanded functionality in that additional mechanical subsystems needed to be connected to and be controlled by the system. If those mechanical subsystems were located a substantial distance from the main control panel, then it was necessary to run the power wiring from the control panel to the mechanical subsystems which entailed significant expense for time and materials for such an installation.

Accordingly, it is a primary object of the present invention to provide an improved building automation system having superior expansion capability.

A related object is to provide such an improved system having expansion functionality utilizing equipment which enables reliable control of the equipment which may be located at a substantial distance from the control panel, but which does not necessitate installing runs of power wiring from the control panel to the equipment to be controlled.

Another object of the present invention is to provide such an improved system having an expansion capability by means of utilizing complementary pairs of modules, including a primary module which can be installed in the main cabinet and the other an expansion module that can be remotely located adjacent to the equipment to be controlled. A corrollary object of the present invention lies in the provision of interconnecting primary and expansion modules with only a few small gauge twisted pair conductors that can be inexpensively installed.

Yet another object of the present invention is to provide reliable operation of the improved building automation system even though the expansion module may be located a significant distance from the main cabinet having the primary module.

Still another object of the present invention is to provide reliable operation in terms of the protocol of the building automation system which requires stringent timing requirements even though the distance between complementary primary and expansion modules can be quite long. A related object lies in the provision for splitting the bidirectional communication bus of the building automation system into a pair of unidirectional signals that are communicated between the primary and expansion modules which maintains the requisite timing specifications and does so utilizing inexpensive components.

Another object of the present invention lies in the provision for supplying power to the expansion module locally rather than installing power conductors from the main cabinet to the expansion modules for powering the same. A related object lies in provision of having electrical isolation between primary and expansion modules and having each expansion cabinet have its own local earth ground reference.

Still another object of the present invention is to provide an improved building automation system utilizing the aforementioned primary and expansion modules which facilitates less expensive installation costs in that the system can include a number of primary modules and expansion modules, the expansion modules of which can be located remotely from the main cabinet adjacent to the mechanical systems which they are to control, thereby minimizing the number of main cabinets that may be required for an installation, were such expansion modules not being utilized. A related object lies in the fact that there is no degradation of operation of the system which utilizes such expansion modules.

It is still another object to provide such an improved system whereby troubleshooting of the installation is more easily accomplished by locating the function modules close to the technical operating installation, and by allowing the function modules to have local manual override capabilities even though the main cabinet may be powered off.

Another object lies in the capability of connecting the expansion module pairs in either a daisy-chain fashion or in a hub fashion. A related object lies in the provision of using the complementary pairs of expansion modules to control mechanical subsystems from a main cabinet that is connected to the network, rather than provide another main cabinet adjacent to the mechanical subsystems, thereby reducing the number of nodes used on the network than would be used if an additional main cabinet were used.

BRIEF DESCRIPTION OF DRAWINGS

Other objects and advantages will become apparent upon reading the following detailed description while referring to the attached drawings, in which.

DETAILED DESCRIPTION

Figure 1:
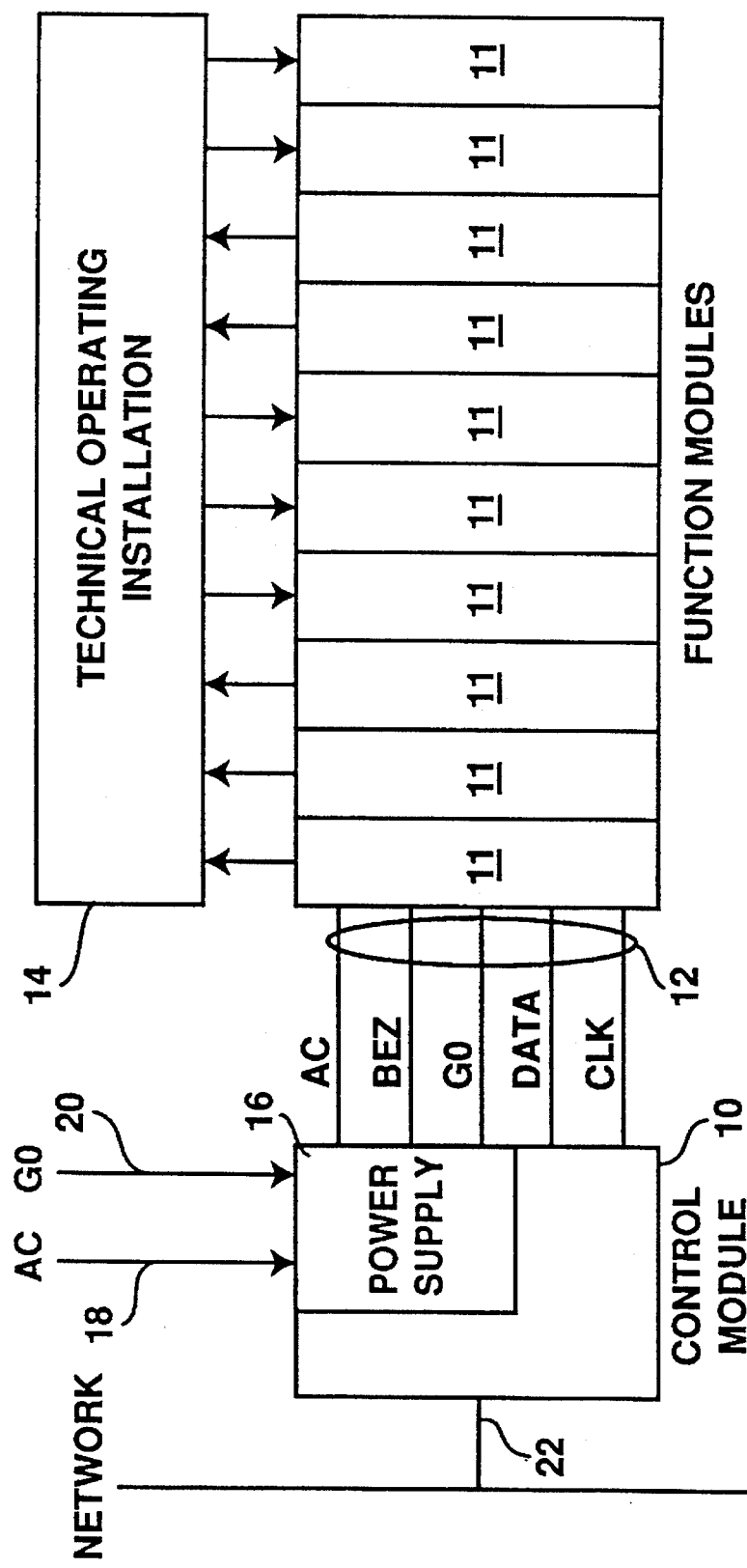
FIG. 1 is a block diagram of an embodiment of the building automation system disclosed in the '855 patent which is prior art to the present invention.

Broadly stated, the present invention represents an improvement of the building automation system disclosed in the aforementioned '855 patent. The improved system enables the building automation functionality to be accomplished utilizing fewer main cabinets and/or fewer power wiring runs between mechanical systems and the main cabinets, for those mechanical systems that are monitored and controlled by the system. The improved system disclosed herein maintains reliable operation, but facilitates a less expensive installed cost even though the mechanical subsystems which are being monitored and controlled may be more diversely located in the physical plant than was possible utilizing the system disclosed in the '855 patent.

The improved system utilizes pairs of complementary modules, one of which is a primary module that is installed at a main cabinet and the other is an expansion module that can be located adjacent the mechanical systems which are to be monitored and controlled. Through the use of the complementary pairs of modules, the necessity for providing home runs of power conductors from the mechanical system to the main cabinet are substantially reduced if not eliminated, which greatly reduces the costs of materials and labor in a total installation.

Also, as a result of using the complementary modules, a single main cabinet may be sufficient to implement the building automation system, as compared to a perhaps several main cabinets being required in the system disclosed in the '855 patent. Since each main cabinet must use a node of the network, and the number of nodes may be limited, the present invention can conserve nodes, without sacrificing either operational reliability or incurring increased costs. Rather than providing home runs for the power wiring between mechanical subsystems and the main cabinet, an expansion cabinet having an expansion module can be located adjacent the mechanical subsystem, and a few pairs of relatively small communication wiring can be used to interconnect the primary and expansion modules to provide the requisite communication to the expansion module for monitoring and controlling the mechanical subsystems.

Additionally, the protocol of the building automation system is such that the timing of the control signals that are transmitted in the system is relatively stringent and given the fact that the building automation system utilizes a bidirectional communication link, reliable operation can be achieved utilizing the complementary modules by virtue of the fact that the communication to and from the complementary modules is unidirectional over a twisted pair of communication wires and the unidirectional signals eliminate the need for intelligent processing of bidirectional signals which increases the cost, and more significantly, can create delays which could have a detrimental effect in the operation of the system.

The control function provided by the control module in the main cabinets is performed by the data and clock signals to the function modules in the main cabinet. The function modules interface with the mechanical subsystems that the building automation system control and the function modules receive signals indicative of status and operational conditions of the mechanical subsystems and also generate control signals for controlling the operation of the mechanical subsystems. The function modules can variously provide analog as well as digital output signals for controlling motors, dampers and the like, and they can variously receive analog and digital signals that are indicative of operational parameters and status conditions of the mechanical subsystems that may be part of the system.

The primary module in the main cabinet splits the bidirectional signals into unidirectional signals and transmits them to or receives them from its corresponding expansion module. The expansion module recombines the unidirectional signals and level shifts them to the local BEZ reference. These reconstituted signals then control the function modules in the expansion cabinet utilizing bus protocols that are set forth in the '855 patent.

The complementary modules also contain opto-isolators for protecting both modules as well as equipment in the main cabinet from damaging voltage or current spikes that may be experienced due to a malfunction or other event. Instead of all expansion modules controlled by the primary modules sharing power supply voltages provided by one power supply in the main cabinet, each expansion cabinet has its own power supply. The use of local power supply connections to the expansion cabinets, coupled with the opto-ioslators, assures that there is electrical isolation between the main and expansion cabinets, and each cabinet has its own local earth ground reference. Accordingly, each expansion module has its own reference BEZ, G0 and AC voltage references.

As a result of these differences, significant improvements result. Rather than have the power conductors from the mechanical systems extend to the function modules in the main control cabinet, expansion cabinets can be installed in the proximity of the mechanical systems thereby lowering the wiring and installed costs. The function modules in the expansion cabinets are so controlled in the same manner as if they were located in the main cabinet, and there is no degradation in performance. The use of the distributed power supply scheme for each expansion cabinet results in higher reliability and ease of start-up. Troubleshooting is more easily accomplished by having the function modules located close to the technical operating installation.

When the main cabinet is powered down, the expansion cabinet still has manual override capability. When the expansion cabinet is powered down, the main cabinet still has control capability from the control module and the function modules that reside in the main cabinet. The use of the complimentary pair of primary and expansion modules allow the use of light sized communications wires, i.e., the No. 22 AWG twisted pair, for long wire runs, which provides a robust and reliable communication link, particularly with run lengths of approximately 100 feet. It should be understood that while it is preferred to limit the run lengths to approximately 100 feet, tests have shown that there is very little degradation in the operation of the system even with run lengths on the order of approximately 400 feet utilizing twisted pair communication cable. It is also possible to run even greater lengths if low capacitance, high quality communication cable is used. If the interconnection is accomplished using a fiber-optic communication link, the distance can be increased even significantly farther. By utilizing primary and expansion complementary modules, more function modules can be distributed over a larger area which can lower the number of control modules required and therefore the installed cost.

Turning now to the drawings, and referring to the arrangement set forth in the prior art '855 patent, and particularly FIG. 1, the arrangement comprises a control module 10 serving as a master transmitter-receiver and at least one function module 11 serving as a slave transmitter-receiver. A bus connection including a number of bus rails 12 connects the control module 10 and the at least one function module 11 for the transmission of addresses and data and for the transmission of operating voltages. The bus rail 12 is installed electrically at the periphery of the installation so that at least one function module is connected to a plurality of conductors forming the bus rail and directly to the installation so that the function module serves as an input/output terminal of said installation for the transmission of process parameters.

The arrangement illustrated in FIG. 1 is located in a control panel and preferrably has a cabinet in which the components are installed. The control function is provided by the control module 10 via the bus protocol to the function modules 11, which interface to the mechanical systems via a technical operating installation 14, (identical to that identified by reference number of the '855 patent). The control module 10 has a built-in power supply and provides all operating power to the function modules. The bus rails 12 serve to transmit AC referenced to G0 (or ground) and BEZ (preferrable DC 21 V) referenced to G0 as the power source to the function modules. The bus rails 12 also carry two bus signals to the function modules as shown. All physical bus signals are referenced to BEZ to minimize the effects of noise from having data signal currents sharing a common return (G0) with motor starters, etc.

The control module 10 and the function modules 11 are connected to the bi-directional bus connection 12 whereby the control and function modules 10 and 11 are connected electrically to each other for the transmission of addresses, data and supply voltages. Each of the control and function modules 10 and 11 contains a transmitter/receiver and, together with the bus 12 serve as a transmission channel, in which the control module 10 on the sending side always functions as a master transmitter/receiver and in which the function module 11 always functions as a slave transmitter/receiver whereby addresses, data and supply voltages are transmitted.

The control module 10 also includes a power supply 16 and it is powered by an AC power source via lines 18 and ground 20. A network line 22 provides a communication link to the network which extends to a computer (not shown).

Figure 2:
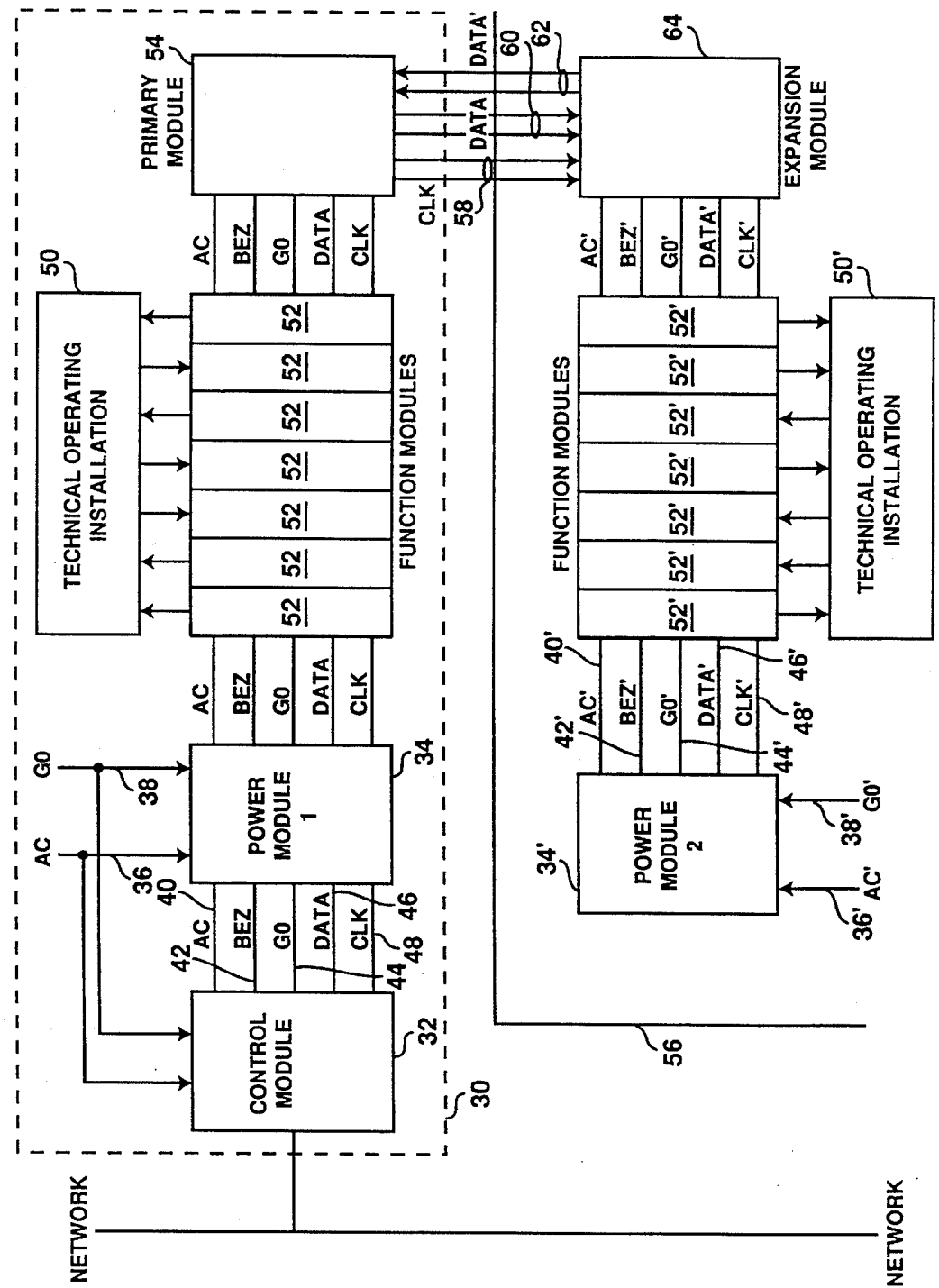
FIG. 2 is a block diagram of the present invention shown together with a main cabinet of the building automation system shown in the '855 patent which includes a network connected to a computer (not shown), a control module, a power module, function modules and a technical operating installation, all of which are shown together with a primary module as well as an expansion cabinet having an expansion module as well as function modules and a power module and technical operating installation.

Turning now to the present invention and referring to FIG. 2, the system also includes a main cabinet 30 which contains a control module 32, which is substantially similar to the control module 10 of FIG. 1, except that the power module is separated from it as shown at 34. It has power supplied through line 36 and ground 38 and the power module 34 is electrically attached to the bus which includes AC line 40, BEZ line 42, ground G0 line 44, data line 46 and a clock line 48. Technical operating installation 50 is shown and is substantially similar to technical operating installation 14 of FIG. 1.

The main cabinet 30 includes a number of function modules 52 and a primary module 54 is also included and is connected to the bus lines 40 through 48. The primary module has three pairs of communication lines extending from the main cabinet 30 to an expansion cabinet 56 that is preferably located adjacent mechanical subsystems that are to be controlled. The communication lines include a pair of clock lines 58, a pair of data lines 60 and a pair of data lines 62. During operation, the lines 58, 60 and 62 are unidirectional lines indicating transmission of clock and data signals in the direction indicated by the arrows associated with the lines as shown. An expansion module 64 is located in the expansion cabinet and it is also connected to the bus lines which are indicated as 40' through 48' and which correspond to the lines 40–48 described with respect to the main cabinet. The expansion cabinet also includes the function modules 52' which are identical to those in the main cabinet as is a technical operating installation 50' that is identical to the ones 50 in the main cabinet. Each of the expansion cabinets has its own power module 34' which are powered by AC line 36' and ground line 38'. It should be understood that the values of the bus signals in the expansion cabinets, while generally similar to those of the buses in the main cabinet, are not necessarily identical.

Figure 3:
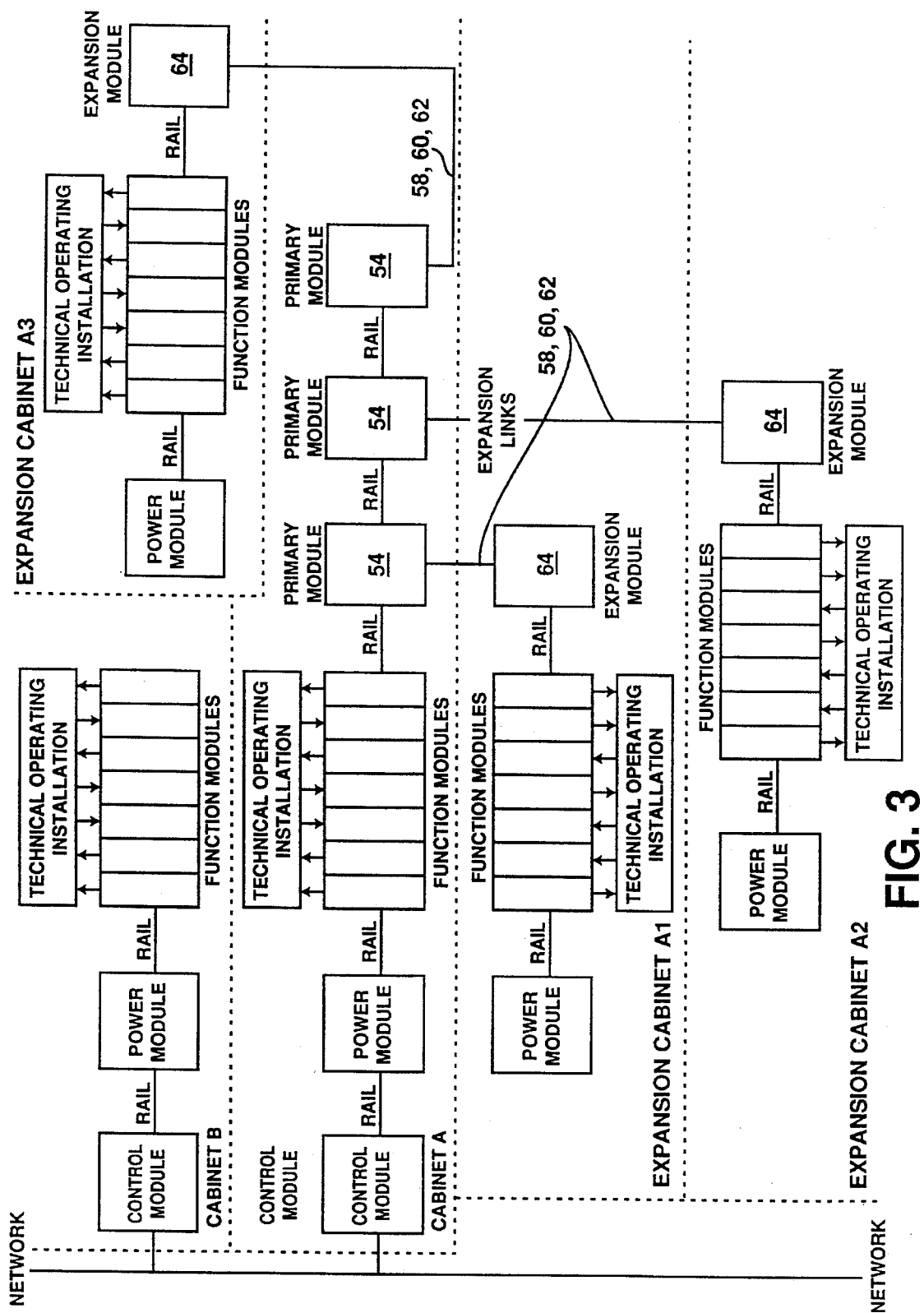
FIG. 3 is a block diagram similar to FIG. 2, but illustrating a building automation system having two main cabinets, with one of the main cabinets being interconnected to several expansion cabinets.

In accordance with another aspect of the present invention and referring to FIG. 3, there is shown two cabinets A and B located within the dotted line boxes as shown, with cabinet A containing three primary modules 54 which are connected to expansion modules 64 in three separate expansion cabinets identified as expansion cabinets A1 through A3. While a single line is shown between the interconnected primary and expansion modules, it should be understood that three pairs of communication conductors comprise this single line as are identified in FIG. 2. It should be appreciated from FIG. 3 that a relatively few number of main cabinets can be utilized in a physical installation even though mechanical equipment can be located adjacent each of the expansion cabinets and they may be separated by substantial distances. In this respect, the length of the runs between the primary and expansion modules is preferably no greater than approximately 100 feet, although an embodiment of the system has been tested and reliably operates even with runs on the order of approximately 400 feet. An essential limitation is the amount of delay that is produced during transmission and this can detrimentally affect the timing of the signals that are sent and received which must be within operational limits of the overall system.

While the arrangement shown in FIG. 3 shows several primary modules located in main cabinet A being connected to expansion modules in expansion cabinets in a hub fashion, the complementary modules can also be connected in a daisy chain fashion. In such latter event, a primary module would be connected to the rail of an expansion cabinet as would the expansion module, and the complementary expansion module would then be located in another expansion cabinet.

Figure 4:
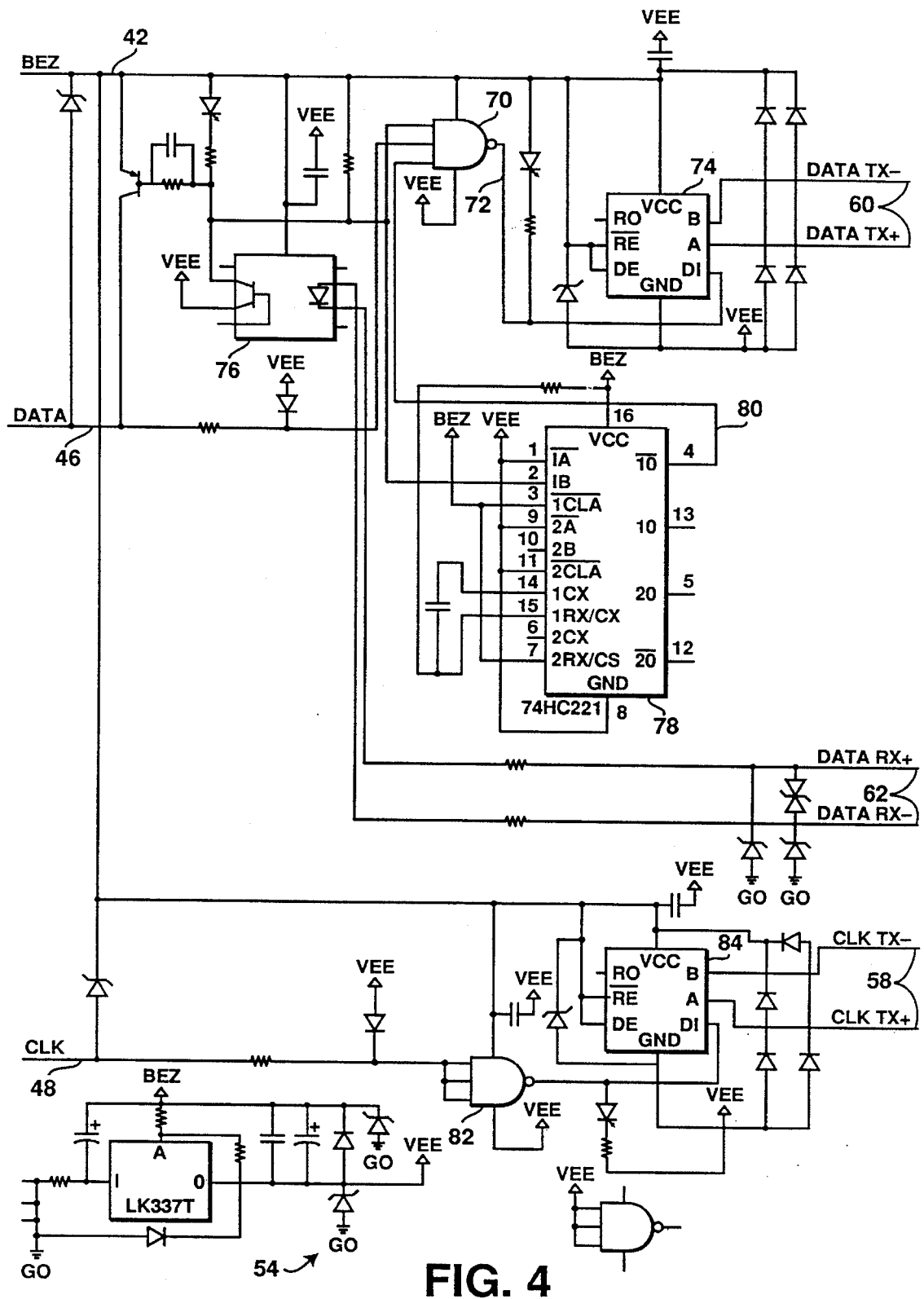
FIG. 4 is a detailed electrical schematic diagram of the circuitry contained in a primary module.

In accordance with another aspect of the present invention, and referring to FIG. 4, the detailed electrical circuit diagram of a primary module 54 is illustrated and includes BEZ line 42, data line 46, and clock line 48. When data is to be transmitted to the expansion module from the primary module, signals on line 46 are applied to a buffer 70 having an output line 72 that extends to a RS485 driver integrated circuit 74. It provides a differential toggled output on lines 60, i.e., when one line goes high the other goes low. When data is received from the expansion module 64, it is input on lines 62 which are applied to an opto-isolator integrated circuit 76. When data is received, it triggers a monostable multivibrator integrated circuit 78 which has an output on line 80 which disables the buffer 70 so that data being received is not transmitted over lines 60 back to the expansion module. The clock signal on line 48 is gated through gate 82 and is also applied to a RS485 driver 84 which provides a differential toggled output on lines 58 which provide the clock signal to the expansion module 64. As is conventional, the BEZ and VEE designations adjacent triangles on the drawing indicate interconnection throughout the primary module 54. It should be understood that if a fiber-optic communication link were used, the RS485 driver circuits would be replaced by a fiber-optic transmitter/receiver circuit, which is well known to those of ordinary skill in the art.

Figure 5:
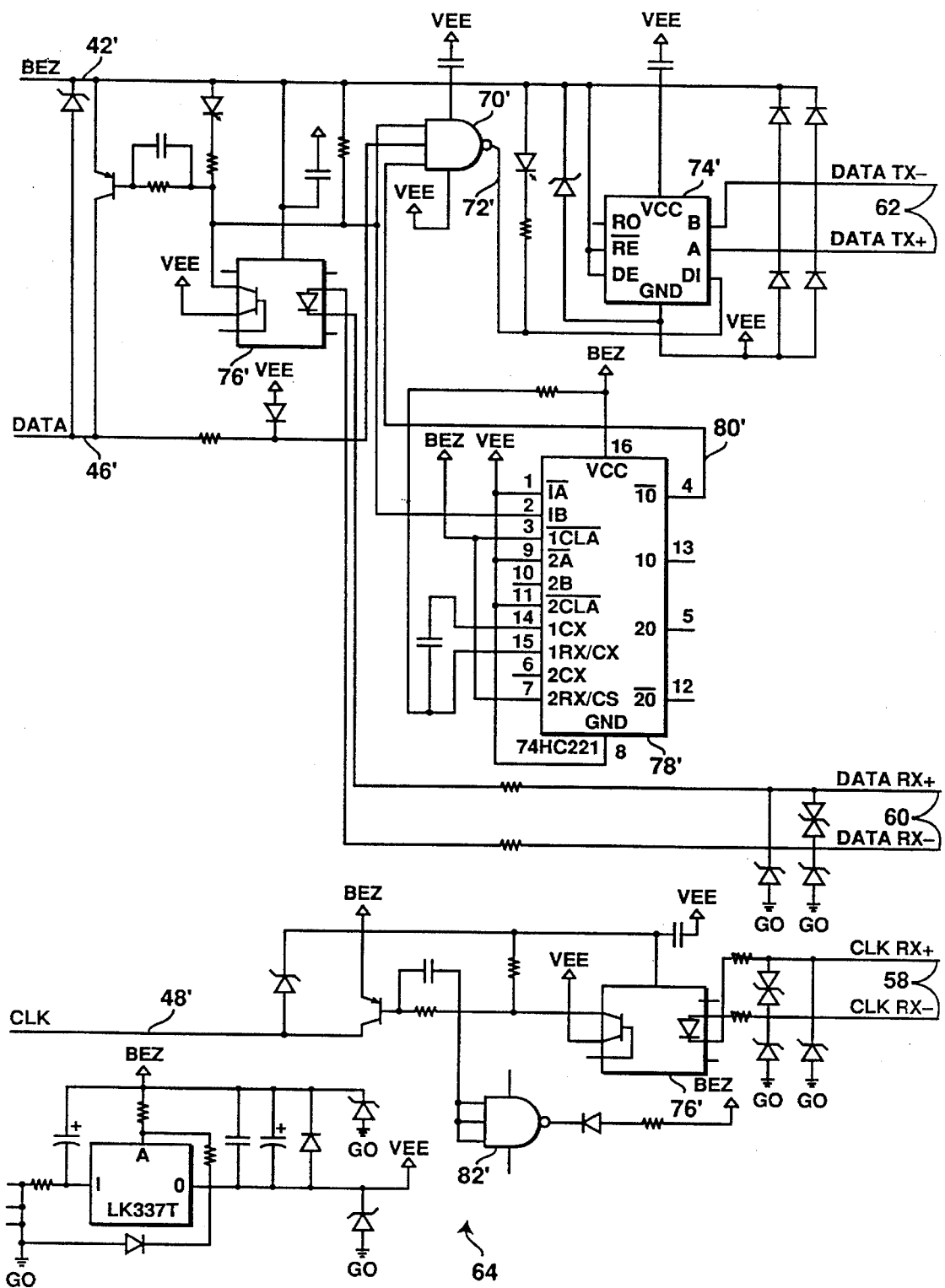
FIG. 5 is a detailed electrical schematic diagram of the circuitry contained in an expansion module of the present invention.

With respect to the expansion module circuitry and referring to FIG. 5, it is very similar to the circuitry of FIG. 4 except that only one RS485 driver is required since only the data signals on lines 62 are transmitted to the primary module 54. However, there are two opto-isolator circuits 76' as shown. Other prime designation are intended to indicate identical components to those illustrated in FIG. 4.

From the foregoing, it should be appreciated and understood that an improved building automation system has been shown and described which provides many advantages over the aforementioned '855 patent in that the superior operational capability of the system disclosed in the '855 patent can be maintained while often reducing the installed cost of such a system by virtue of the utilization of the primary and expansion modules. The expansion modules need only be connected to the main cabinet by three preferably twisted pair small gauge communication conductors which eliminates the necessity of providing power runs from the mechanical equipment to the main cabinets. By utilizing the primary and expansion modules, there is a potential that fewer numbers of main cabinets need be installed than would otherwise be necessary.

While various embodiments of the present invention have been shown and described, it should be understood that various alternatives, substitutions and equivalents can be used, and the present invention should only be limited by the claims and equivalents of the claims.

Various features of the present invention are set forth in the following claims.

What is claimed is:

1. A building automation system of the type which is controllable by a computer means via a network, said system comprising:

a main cabinet means including a rail means, said rail means including a data conduction means for providing bidirectional data communications along said rail means;

said rail means further including a clock signal conduction means, an AC power conduction means, a DC power conduction means and a ground conduction means;

a power module means, located in said main cabinet means, connectable to an external source of AC power and coupled to said rail means, for providing AC and DC power to said rail means;

a control module, located in said main cabinet means and coupled to both said rail means and the computer means, for controlling communications to and from the computer means and communicating a clock signal on said clock signal conduction means;

at least one function module means, located in said main cabinet means and coupled to said control module and a plurality of mechanical subsystems, for receiving signals indicative of operational conditions of said mechanical subsystems, for generating operational status signals for transmission to said control module means and for generating control signals for controlling the operation of said mechanical subsystems;

first expansion module means located in said main cabinet means and being connected to said rail means and being communicably coupled to said control module via said rail means;

an expansion cabinet means including expansion rail means, said expansion rail means having data conduction means for providing bidirectional data communications along said expansion rail means;

said expansion rail means further including an expansion clock signal conduction means, an expansion AC power conduction means, an expansion DC power conduction means and an expansion ground conduction means;

an expansion power module means located in said expansion cabinet means and connectable to said external source of AC power for providing AC and DC power to said expansion rail means;

at least one function module means located in said expansion cabinet means for receiving signals indicative of operational conditions of mechanical subsystems, for generating operational status signals for transmission to said control module means and for generating control signals for controlling the operation of the mechanical subsystems;

second expansion module means located in said expansion cabinet means and being connected to said expansion rail means and being communicably coupled to each of said function module means located in said expansion cabinet means via said expansion rail means;

a light weight opto-isolated communication link between said first and second expansion module means, said link providing communication of data and clock signals between said first and second expansion module means so that said at least one function module means located in said expansion cabinet means is operated and controlled in a similar manner as said at least one function module means located in said main cabinet, while electrically isolating said first and second expansion module means from one another.

2. A system as defined in claim 1 wherein said communication link comprises at least two pairs of conductors, each of said first and second expansion module means having means for transmitting and receiving data signals unidirectionally on each of said two pairs of conductors.

3. A system as defined in claim 2 wherein said communication link further comprises a third pair of conductors over which a clock signal is transmitted from said first expansion module means to said second expansion module means.

4. A system as defined in claim 3 wherein said pairs of conductors comprise twisted pairs of approximately #22 AWG insulated wire.

5. A system as defined in claim 2 wherein each of said first and second expansion module means further includes opto-isolating means connected to one end of each pair of conductors in said communication link, said opto-isolating means being located at a receiving end of the pairs of conductors.

6. A building automation system of the type which is controllable by a computer means via a network, said system comprising:

at least one main cabinet means including a rail means having a data conductor means for providing bidirectional data communications;

said rail means further including a clock signal conductor means, at least one power conductor means and a ground conductor means;

a power module means located in said main cabinet means, connectable to an external source of AC power and coupled to said rail means, for providing power to said rail means;

a control module, located in said main cabinet means and coupled to both said rail means and the computer means, for controlling communications to and from the computer means and communicating a clock signal on said clock signal conductor means;

at least one function module means located in said main cabinet means and coupled to said control module and a plurality of mechanical subsystems, for receiving signals indicative of operational conditions of said mechanical subsystems, for generating operational status signals for transmission to said control module means and for generating control signals for controlling the operation of said mechanical subsystems;

first expansion module means located in said main cabinet means and being connected to said rail means and being communicably coupled to said control module via said rail means;

an expansion cabinet means located remotely from said main cabinet, said expansion cabinet means also having a power module means, an expansion rail means including a data conductor means for providing bidirectional data communications, at least one function module means, and a second expansion module means located in said expansion cabinet means and being connected to said expansion rail means and being communicably coupled to each of said function module means in said expansion cabinet means via said expansion rail means;

at least two unidirectional opto-isolated communication links between said first and second expansion module means for transmitting data between said expansion module means, while electrically isolating said expansion module means from one another.

7. A system as defined in claim 6 further including a third unidirectional communication link for transmitting a clock signal from said first to said second expansion module.

8. A system as defined in claim 7 wherein each said communication link comprises a pair of conductors of approximately #22 AWG insulated wire.

9. A system as defined in claim 7 wherein each of said unidirectional communication link comprises a pair of conductors.

10. A system as defined in claim 9 wherein each of said first and second expansion module means further includes opto-isolating means connected to one end of each pair of conductors in said communication link, said opto-isolating means being located at a receiving end of said pair of conductors.

* * * * *